US012567880B2

(12) United States Patent
Li

(10) Patent No.: US 12,567,880 B2
(45) Date of Patent: Mar. 3, 2026

(54) IMPEDANCE CONVERSION DEVICE FOR VEHICLE-MOUNTED GIGABIT ETHERNET CHIP ADAPTIVE COAXIAL CABLE TRANSMISSION

(71) Applicant: MOTORCOMM (SHANGHAI) ELECTRONIC TECHNOLOGY CO., LTD, Shanghai (CN)

(72) Inventor: Meng Li, Shanghai (CN)

(73) Assignee: MOTORCOMM (SHANGHAI) ELECTRONIC TECHNOLOGY CO., LTD, Shanghai (CN)

( * ) Notice: Subject to any disclaimer, the term of this patent is extended or adjusted under 35 U.S.C. 154(b) by 328 days.

(21) Appl. No.: 18/398,121

(22) Filed: Dec. 27, 2023

(65) Prior Publication Data

US 2025/0219676 A1 Jul. 3, 2025

(30) Foreign Application Priority Data

Jul. 26, 2023 (CN) .......................... 202310926177.3

(51) Int. Cl.
H04B 3/23 (2006.01)
H04B 1/58 (2006.01)
H04B 3/03 (2006.01)

(52) U.S. Cl.
CPC ............. *H04B 3/235* (2013.01); *H04B 1/586* (2013.01); *H04B 3/03* (2013.01)

(58) Field of Classification Search
CPC ....... H01R 13/6473; H04B 1/586; H04B 3/03
USPC .......................................................... 375/257
See application file for complete search history.

(56) References Cited

FOREIGN PATENT DOCUMENTS

| | | | |
|---|---|---|---|
| CN | 113488977 | * | 6/2023 |
| JP | 2008228171 | * | 9/2008 |

* cited by examiner

*Primary Examiner* — Leila Malek
(74) *Attorney, Agent, or Firm* — Clement Cheng

(57) ABSTRACT

The invention provides an impedance conversion device for a vehicle-mounted gigabit Ethernet chip adaptive to a coaxial cable transmission, and relates to the technical field of Ethernet communication. The impedance conversion device has a first impedance loop, a cable wiring end of the first impedance loop is connected with the coaxial cable, and a chip wiring end of the first impedance loop is connected with a first signal output end of the vehicle-mounted Ethernet chip; a first chip resistor is connected between a first signal input end and the first signal output end of the vehicle-mounted Ethernet chip, and the sum of an impedance value of the first impedance loop and a resistance value of the first chip resistor is equal to an equivalent resistance value of the coaxial cable.

8 Claims, 3 Drawing Sheets

IMPEDANCE CONVERSION DEVICE FOR VEHICLE-MOUNTED GIGABIT ETHERNET CHIP ADAPTIVE COAXIAL CABLE TRANSMISSION

BACKGROUND OF THE INVENTION

1. Field of the Invention

The present invention relates to the field of Ethernet communication technology, particularly to an impedance conversion device for a vehicle-mounted Gigabit Ethernet chips adaptive to a coaxial cable transmission.

2. Description of the Related Art

Coaxial cables are mainly used for transmitting video and data signals. One typical application is the transmission of television signals through 75-ohm coaxial cables. However, due to inadequate infrastructure, many areas in China still use coaxial cables for television signal transmission instead of using Gigabit optical fibers.

Currently, Gigabit Ethernet chips are unable to adapt to coaxial cables, so there is a need for an impedance conversion device to connect coaxial cables, enabling the transmission of Gigabit Ethernet signals through coaxial cables.

SUMMARY OF THE INVENTION

In response to the issues present in existing technologies, the invention provides an impedance conversion device for a vehicle-mounted Gigabit Ethernet chips adaptive to a coaxial cable transmission, comprising:

a first impedance loop, a cable wiring end of the first impedance loop is connected with the coaxial cable, and a chip wiring end of the first impedance loop is connected with a first signal output end of the vehicle-mounted Ethernet chip;

a first chip resistor is connected between a first signal input end and the first signal output end of the vehicle-mounted Ethernet chip, and the sum of an impedance value of the first impedance loop and a resistance value of the first chip resistor is equal to an equivalent resistance value of the coaxial cable;

a second impedance loop, a cable wiring end of the second impedance loop is grounded, and a chip wiring end of the second impedance loop is connected with a second signal output end of the vehicle-mounted Ethernet chip.

Preferably, the first impedance loop comprises:

a first resistor, wherein one end of the first resistor is connected to one end of a first DC-blocking capacitor;

an other end of the first resistor serves as the chip wiring end of the first impedance loop;

an other end of the first DC-blocking capacitor serves as the cable wiring end of the first impedance loop.

Preferably, the second impedance loop comprises:

a second resistor, wherein one end of the second resistor is connected to one end of a second DC-blocking capacitor;

an other end of the second resistor serves as the chip wiring end of the second impedance loop;

an other end of the second DC-blocking capacitor serves as the cable wiring end of the second impedance loop.

Preferably, the second impedance loop comprises:

a third DC-blocking capacitor, wherein one end of the third DC-blocking capacitor, which serves as the cable wiring end of the second impedance loop, is connected to a third resistor, and an other end of the third resistor is grounded;

an other end of the third DC-blocking capacitor serves as the chip wiring end of the second impedance loop.

Preferably, the vehicle-mounted Ethernet chip comprises:

the first chip resistor connected between the first signal input terminal and the first signal output terminal;

a second chip resistor connected between a second signal input terminal and a second signal output terminal;

a first hybrid circuit connected between the first signal input terminal and the second signal output terminal, for echo cancellation between the first signal input terminal and the second signal output terminal;

a second hybrid circuit connected between the second signal input terminal and the first signal output terminal, for echo cancellation between the second signal input terminal and the first signal output terminal.

Preferably, the first hybrid circuit comprises:

a first anechoic resistor, wherein one end of the first anechoic resistor is connected to one end of a second anechoic resistor;

an other end of the first anechoic resistor is connected to the first signal input terminal, and an other end of the second anechoic resistor is connected to the second signal output terminal.

Preferably, the second hybrid circuit comprises:

a third anechoic resistor, wherein one end of the third anechoic resistor is connected to one end of a fourth anechoic resistor;

an other end of the third anechoic resistor is connected to the first signal input terminal, and an other end of the fourth anechoic resistor is connected to the first signal output terminal.

Preferably, the vehicle-mounted Ethernet chip, the first impedance loop, and the second impedance loop are integrated on one circuit board.

The vehicle-mounted Ethernet chip has the beneficial effects that the impedance conversion device is arranged between the vehicle-mounted Ethernet chip and the coaxial cable, so that the coaxial cable can also carry out gigabit Ethernet signal transmission.

DETAILED DESCRIPTION

Figure 1:
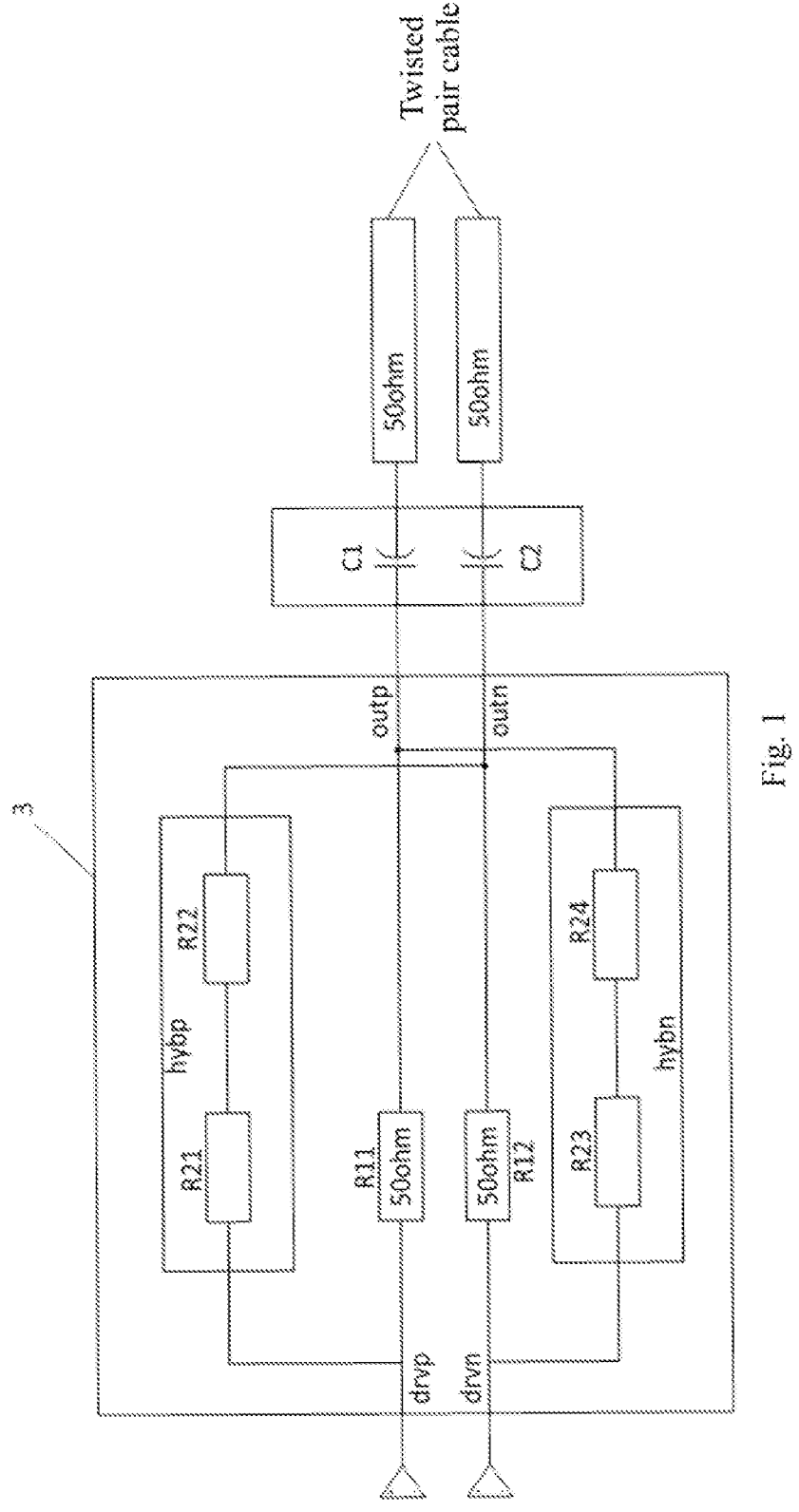
FIG. 1 is a schematic diagram of the structure of a vehicle-mounted Ethernet chip connected to twisted pair cable in the prior art.

The present invention will be described in detail below in conjunction with the accompanying drawings and specific embodiments. It should be understood that the present invention is not limited to the disclosed embodiments, and other embodiments that are in line with the spirit of the present invention can also fall within the scope of the present invention.

In a preferred embodiment of the present invention, based on the aforementioned issues existing in the prior art, an impedance conversion device for a vehicle-mounted gigabit Ethernet chip adaptive to a coaxial cable transmission is provided, comprising:

a first impedance loop 1, a cable wiring end of the first impedance loop 1 is connected with the coaxial cable 4, and a chip wiring end of the first impedance loop 1 is connected with a first signal output end of the vehicle-mounted Ethernet chip 3;

a first chip resistor R11 is connected between a first signal input end and the first signal output end of the vehicle-mounted Ethernet chip 3, and the sum of an impedance value of the first impedance loop 1 and a resistance value of the first chip resistor R11 is equal to an equivalent resistance value of the coaxial cable 4;

a second impedance loop 2, a cable wiring end of the second impedance loop 2 is grounded, and a chip wiring end of the second impedance loop 2 is connected with a second signal output end of the vehicle-mounted Ethernet chip 3.

In a preferred embodiment of the invention, the first impedance loop 1 comprises:

a first resistor R1, wherein one end of the first resistor R1 is connected to one end of a first DC-blocking capacitor C1;

an other end of the first resistor R1 serves as the chip wiring end of the first impedance loop 1;

an other end of the first DC-blocking capacitor C1 serves as the cable wiring end of the first impedance loop 1.

In a preferred embodiment of the invention, the second impedance loop 2 comprises:

a second resistor R2, wherein one end of the second resistor R2 is connected to one end of a second DC-blocking capacitor C2;

an other end of the second resistor R2 serves as the chip wiring end of the second impedance loop 2;

an other end of the second DC-blocking capacitor C2 serves as the cable wiring end of the second impedance loop 2.

In a preferred embodiment of the invention, the impedance of the coaxial cable 4 is 75 ohms, the resistance value of the first resistor R1 is 25 ohms, the capacitance value of the first DC-blocking capacitor C1 is 100 nF, the resistance value of the second resistor R2 is 30 ohms, and the capacitance value of the second DC-blocking capacitor C2 is 100 nF.

In a preferred embodiment of the invention, the vehicle-mounted Ethernet chip 3 comprises:

the first chip resistor R11 connected between the first signal input terminal drvp and the first signal output terminal outp;

a second chip resistor R12 connected between a second signal input terminal drvn and a second signal output terminal outn;

a first hybrid circuit hybp connected between the first signal input terminal drvp and the second signal output terminal outn, for echo cancellation between the first signal input terminal drvp and the second signal output terminal outn;

a second hybrid circuit hybn connected between the second signal input terminal drvn and the first signal output terminal outp, for echo cancellation between the second signal input terminal drvn and the first signal output terminal outp.

In a preferred embodiment of the invention, the first hybrid circuit hybp comprises:

a first anechoic resistor R21, wherein one end of the first anechoic resistor R21 is connected to one end of a second anechoic resistor R22;

an other end of the first anechoic resistor R21 is connected to the first signal input terminal drvp, and an other end of the second anechoic resistor R22 is connected to the second signal output terminal outn.

In a preferred embodiment of the invention, the second hybrid circuit hybn comprises:

a third anechoic resistor R23, wherein one end of the third anechoic resistor R23 is connected to one end of a fourth anechoic resistor R24;

an other end of the third anechoic resistor R23 is connected to the first signal input terminal drvn, and an other end of the fourth anechoic resistor R24 is connected to the second signal output terminal outp.

Specifically, in this embodiment, as shown in FIG. 1, it is a schematic diagram of the structure when the vehicle-mounted Ethernet chip is connected to twisted pair cable for signal transmission in the prior art. FIG. 1 includes three parts: the vehicle-mounted Ethernet chip on the left, the twisted pair cable connected on the right, and two DC-blocking capacitors are connected therebetween. In the vehicle-mounted Ethernet chip, a hybrid circuit is arranged for echo cancellation, enabling full-duplex communication for Gigabit Ethernet and allowing simultaneous signal transmission and reception on the twisted pair cable.

In FIG. 1, each signal line in the twisted pair cable is 50 ohm. Between the signal output terminal and the signal input terminal of the vehicle-mounted Ethernet chip (including the p-side and n-side, with the first signal output terminal and the second signal output terminal represented as outp and outn, and the first signal input terminal and the second signal input terminal represented as drvp and drvn), there is a 50 ohm resistor connected, ensuring the impedance of the vehicle-mounted Ethernet chip and the impedance of the opposite end is matched. The vehicle-mounted Ethernet chip is equipped with hybrid circuits (corresponding to the n-side and p-side, they are first and second hybrid circuits represented as hybp and hybn, respectively) to achieve echo cancellation, enabling the vehicle-mounted Ethernet chip to simultaneously transmit and receive signals on the same twisted pair cable, thus realizing full-duplex communication for gigabit Ethernet. The hybrid circuit herein is a conventional technique in the field of Ethernet communication, and the specific implementation principle is not further elaborated here.

Figure 2:
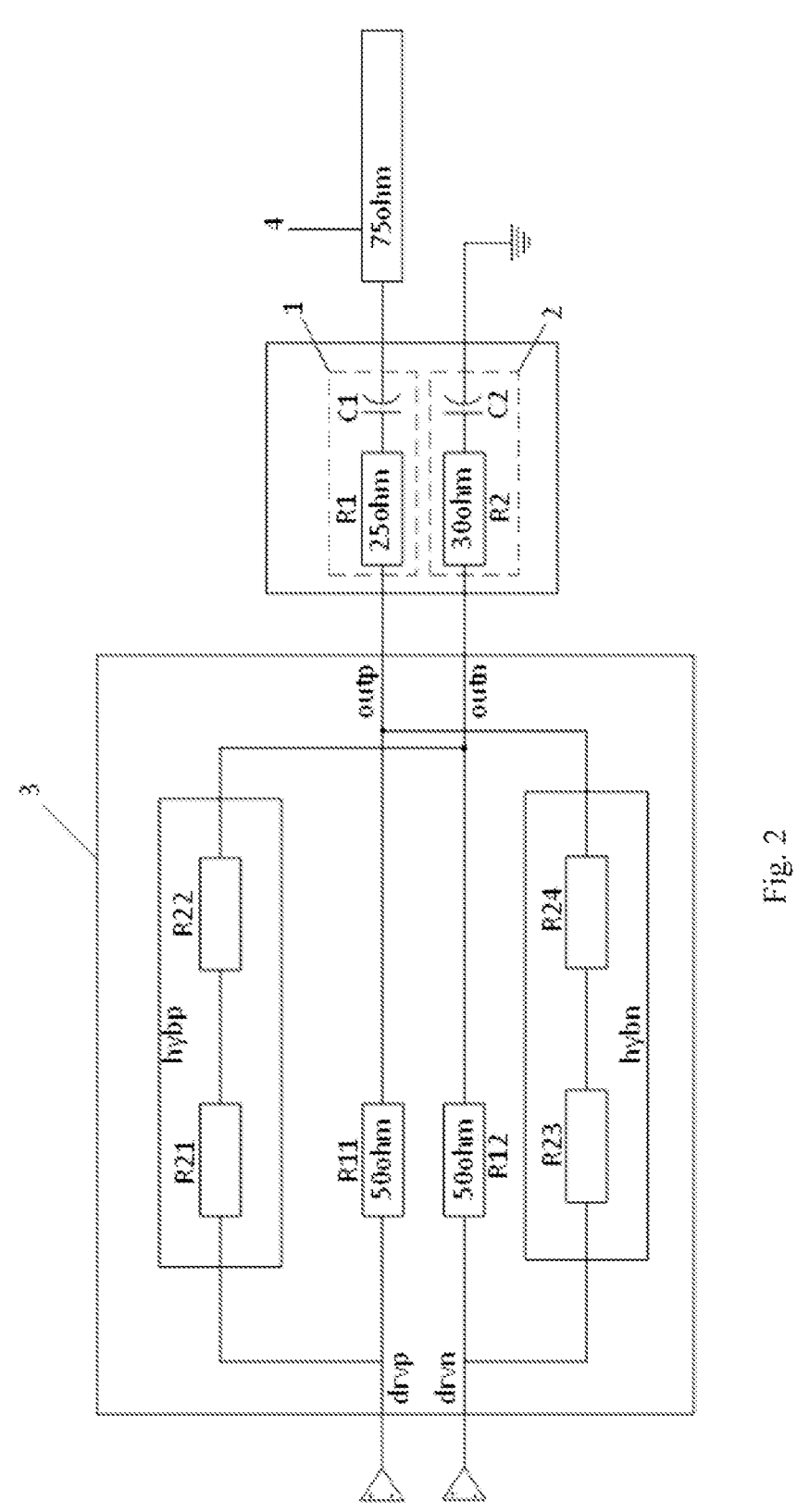
FIG. 2 is a schematic diagram of the structure of the impedance conversion device for a vehicle-mounted gigabit Ethernet chip adaptive to a coaxial cable transmission in a preferred embodiment of the present invention.

The impedance conversion device provided by the present invention is connected between coaxial cable 4 and the vehicle-mounted Ethernet chip, enabling the coaxial cable 4 to also achieve gigabit Ethernet signal transmission, as shown in FIG. 2. The impedance conversion device is connected after the outp and outn of the chip and includes a first impedance loop 1 (a first resistor R1 and a first DC-blocking capacitor C1) and a second impedance loop 2 (a second resistor R2 and a second DC-blocking capacitor C2). The two impedance loops are respectively connected to outp and outn, with the first impedance loop 1 connected to the coaxial cable 4 and the second impedance loop 2 connected to virtual ground. In this embodiment, the coaxial cable used is a 75-ohm coaxial cable 4 (commonly used for transmitting signals in traditional home television systems).

Specifically, the first resistor R1 is 25 ohm, and there is a 50-ohm first chip resistor R11 connected between drvp and outp. In this case, for the first impedance loop 1, the sum of the resistance value of the first chip resistor R11 (50 ohm) and the resistance value of the first resistor R1 (25 ohm)

equals the impedance value of the coaxial cable 4 (75 ohm). This achieves matching between the impedance of the vehicle-mounted Ethernet chip and the impedance of the opposite end (in this case, a 75-ohm coaxial cable), but it compromises the echo cancellation effect of the hybp circuit corresponding to the first impedance loop 1.

In this embodiment, the resistance value of the second resistor R2 is set to 30 ohm. The drvp and the drvn in the chip are connected to the operational amplifier respectively, which transmits signal externally via the drvp and the drvn. Assuming the signal amplitude transmitted by the operational amplifier is 1, then the amplitude at drvp is 1. At outp, due to the voltage division caused by the first resistor R1, the first chip resistor R11, and the coaxial cable 4, the amplitude is $\frac{2}{3}$ (i.e., $100/(50+75+25)$). Since drvn is the inverse of drvp, its amplitude is $-1$, and the amplitude at outn can be similarly calculated as $-\frac{3}{8}$ (i.e., $-30/(50+30)$). In the hybp circuit, there are first anechoic resistor R21 and second anechoic resistor R22 connected between drvp and outn, with the resistance ratio of R21 to R22 being 2:1 (and much greater than 50 ohm), resulting in a voltage division ratio of 2:1. In this embodiment, taking the resistance values of the first anechoic resistor R21 and the second anechoic resistor R22 as an example, assume they are 4 Kohm and 2 Kohm respectively. Therefore, the signal amplitude in the hybp circuit is $1*\frac{1}{2}+(-\frac{3}{8})=\frac{1}{8}$. In the hybn circuit, there are also a third anechoic resistor R23 and a fourth anechoic resistor R24 connected between drvn and outp, with the resistance ratio of R23 to R24 being 2:1 (and much greater than 50 ohm), resulting in a voltage division ratio of 2:1. Taking the resistance values of the third anechoic resistor R23 and the fourth anechoic resistor R24 as an example, assume they are 4 Kohm and 2 Kohm respectively. Therefore, the signal amplitude in the hybn circuit is $-1*\frac{1}{2}+\frac{2}{3}=\frac{1}{6}$. At this point, the difference in signal amplitude (i.e., the amplitude of the uncancelled signal) between hybn and hybp is $hybp-hybn=\frac{1}{8}-\frac{1}{6}=-\frac{1}{24}$. It can be seen that there is a difference of nearly 50 times between $-\frac{1}{24}$ and the signal amplitude of 1 transmitted by the operational amplifier, which can be neglected. Therefore, by using the impedance conversion device provided by the present invention to connect between the vehicle-mounted Ethernet chip and the 75-ohm coaxial cable, the vehicle-mounted Ethernet chip can also adapt to the coaxial cable signal transmission, achieving the same gigabit Ethernet signal transmission effect as twisted-pair cables, thereby expanding the coverage of gigabit Ethernet signal transmission technology to more areas.

For different vehicle-mounted Ethernet chips and different coaxial cables, the resistance values of the first and second resistors in the impedance conversion device in this embodiment need to be adjusted through calculations to minimize the difference in signal amplitude between hybp and hybn, in order to achieve the best Ethernet communication effect.

Figure 3:
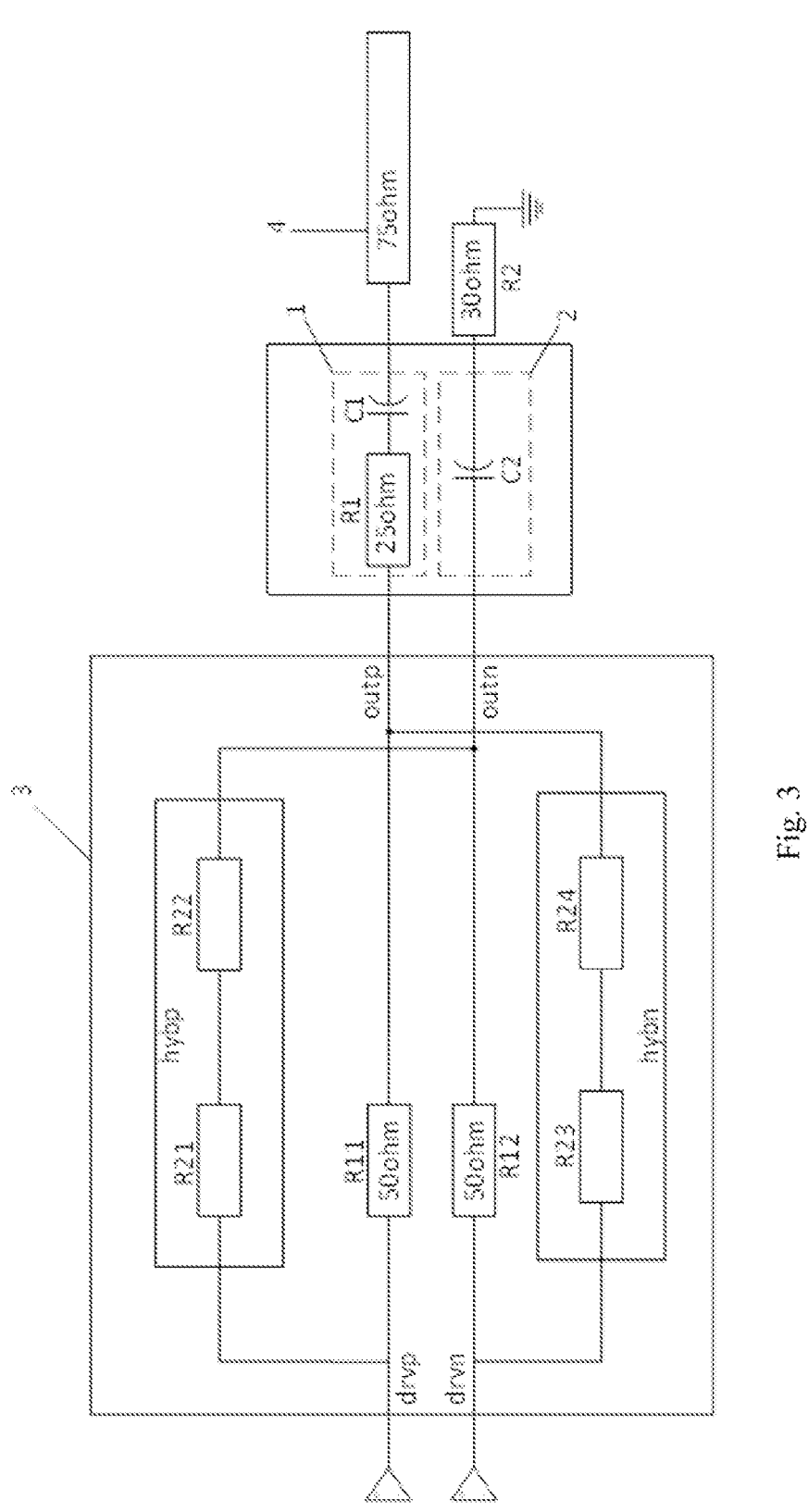
FIG. 3 is a schematic diagram of another impedance conversion device for a vehicle-mounted gigabit Ethernet chip adaptive to a coaxial cable transmission in a preferred embodiment of the present invention.

Specifically, as shown in FIG. 3, in this embodiment, the resistor R2 in the second impedance circuit 2 can be connected on the side of the DC-blocking capacitor C2 near the coaxial cable 4, whether it is placed inside or outside the impedance conversion device.

In a preferred embodiment of the invention, the vehicle-mounted Ethernet chip, the first impedance loop 1, and the second impedance loop 2 are integrated on one circuit board.

Specifically, the vehicle-mounted Ethernet chip, the first impedance circuit 1, and the second impedance circuit 2 are integrated on the same circuit board. The impedance conversion device of the present invention can be added to the circuit board that enables Ethernet communication through traditional twisted-pair cables, connecting the two signal output terminals of the vehicle-mounted Ethernet chip and the coaxial cable. Users can choose between twisted-pair cable communication or coaxial cable communication based on their needs.

The above is only the preferred embodiment of the present invention and should not be construed as limiting the implementation and scope of protection of the present invention. Those skilled in the art should be able to appreciate that any equivalent substitutions and obvious modifications derived from the disclosure and illustrations in this specification should be included within the scope of protection of the present invention.

What is claimed is:

1. An impedance conversion device for vehicle-mounted gigabit Ethernet chip adaptive coaxial cable transmission, comprising:
   a first impedance loop, a cable wiring end of the first impedance loop is connected with a coaxial cable, and a chip wiring end of the first impedance loop is connected with a first signal output end of the vehicle-mounted gigabit Ethernet chip;
   a first chip resistor is connected between a first signal input end and the first signal output end of the vehicle-mounted gigabit Ethernet chip, and the sum of an impedance value of the first impedance loop and a resistance value of the first chip resistor is equal to an equivalent resistance value of the coaxial cable; and
   a second impedance loop, a cable wiring end of the second impedance loop is grounded, and a chip wiring end of the second impedance loop is connected with a second signal output end of the vehicle-mounted gigabit Ethernet chip.

2. The impedance conversion device of claim 1, wherein the first impedance loop comprises:
   a first resistor, wherein one end of the first resistor is connected to one end of a first DC-blocking capacitor;
   an other end of the first resistor serves as the chip wiring end of the first impedance loop; and
   an other end of the first DC-blocking capacitor serves as the cable wiring end of the first impedance loop.

3. The impedance conversion device of claim 1, wherein the second impedance loop comprises:
   a second resistor, wherein one end of the second resistor is connected to one end of a second DC-blocking capacitor;
   an other end of the second resistor serves as the chip wiring end of the second impedance loop; and
   an other end of the second DC-blocking capacitor serves as the cable wiring end of the second impedance loop.

4. The impedance conversion device of claim 1, wherein the second impedance loop comprises:
   a third DC-blocking capacitor, wherein one end of the third DC-blocking capacitor, which serves as the cable wiring end of the second impedance loop, is connected to a third resistor, and an other end of the third resistor is grounded; and
   an other end of the third DC-blocking capacitor serves as the chip wiring end of the second impedance loop.

5. The impedance conversion device of claim 1, wherein the vehicle-mounted gigabit Ethernet chip comprises:
   the first chip resistor connected between a first signal input terminal and a first signal output terminal;
   a second chip resistor connected between a second signal input terminal and a second signal output terminal;
   a first hybrid circuit connected between the first signal input terminal and the second signal output terminal, for echo cancellation between the first signal input terminal and the second signal output terminal; and a second hybrid circuit connected between the second signal input terminal and the first signal output terminal, for echo cancellation between the second signal input terminal and the first signal output terminal.

6. The impedance conversion device of claim 5, wherein the first hybrid circuit comprises:

a first anechoic resistor, wherein one end of the first anechoic resistor is connected to one end of a second anechoic resistor; and an other end of the first anechoic resistor is connected to the first signal input terminal, and an other end of the second anechoic resistor is connected to the second signal output terminal.

7. The impedance conversion device of claim 5, wherein the second hybrid circuit comprises:

a third anechoic resistor, wherein one end of the third anechoic resistor is connected to one end of a fourth anechoic resistor; and an other end of the third anechoic resistor is connected to the first signal input terminal, and an other end of the fourth anechoic resistor is connected to the first signal output terminal.

8. The impedance conversion device of claim 1, wherein the vehicle-mounted gigabit Ethernet chip, the first impedance loop, and the second impedance loop are integrated on one circuit board.

\* \* \* \* \*